US011888865B2

(12) United States Patent
Caldwell et al.

(10) Patent No.: US 11,888,865 B2
(45) Date of Patent: Jan. 30, 2024

(54) METHOD AND PROTECTION APPARATUS TO PREVENT MALICIOUS INFORMATION COMMUNICATION IN IP NETWORKS BY EXPLOITING BENIGN NETWORKING PROTOCOLS

(71) Applicant: Belden, Inc., St. Louis, MO (US)

(72) Inventors: Jeffrey Caldwell, Sunnyvale, CA (US);
Divij Agarwal, San Jose, CA (US);
Ashish Mathur, San Jose, CA (US);
Raja Chhabra, Gurgaon (IN); Gourav Rastogi, Gurgaon (IN)

(73) Assignee: Belden, Inc., St. Louis, MO (US)

( * ) Notice: Subject to any disclaimer, the term of this patent is extended or adjusted under 35 U.S.C. 154(b) by 657 days.

(21) Appl. No.: 16/694,039

(22) Filed: Nov. 25, 2019

(65) Prior Publication Data

US 2020/0092312 A1  Mar. 19, 2020

Related U.S. Application Data

(62) Division of application No. 15/400,743, filed on Jan. 6, 2017, now Pat. No. 10,491,611.

(Continued)

(51) Int. Cl.
*H04L 9/40* (2022.01)
*H04L 61/4511* (2022.01)
(Continued)

(52) U.S. Cl.
CPC ........ *H04L 63/1416* (2013.01); *H04J 3/0667* (2013.01); *H04L 61/4511* (2022.05);
(Continued)

(58) Field of Classification Search
CPC ............ H04L 63/1416; H04L 61/5007; H04L 61/4511; H04L 63/0236; H04L 63/0245;
(Continued)

(56) References Cited

U.S. PATENT DOCUMENTS 7,818,795 B1 * 10/2010 Arad ................... H04L 63/1408
726/13
9,692,784 B1   6/2017 Nenov
(Continued)

FOREIGN PATENT DOCUMENTS

CN     101286896 A    10/2008
CN     101495993 A     7/2009
(Continued)

OTHER PUBLICATIONS (Alert TA 13-088A), DNS Amplification Attacks "The National Cybersecurity and Communications Integration Center", Mar. 29, 2013,"https://www.us-cert.gov/ncas/alerts/T A 13-088A".
(Continued)

*Primary Examiner* — Mandish K Randhawa
(74) *Attorney, Agent, or Firm* — Foley & Lardner LLP

(57) ABSTRACT

Systems and methods of the disclosure can implement intrusion radiation protection (IRP) to prevent malicious IP traffic in a secure network. The IRP system can receive an IP packet, determine that a protocol of the IP packet matches a predetermined policy of a plurality of predetermined policies, classify the IP packet based on the predetermined policy and a size of the IP packet, inspect a payload of the IP packet responsive to the classification to determine features of the IP packet, determine that one of the features of the IP packet is improper based on the classification, and flag the IP packet as suspect based on the determination. The IRP system can log and/or drop the flagged IP packet. The IRP system can additionally replace a payload of the IP packet with a second payload, and transmit the IP packet with the second payload to its destination.

20 Claims, 8 Drawing Sheets

Related U.S. Application Data

(60) Provisional application No. 62/276,716, filed on Jan. 8, 2016.

(51) Int. Cl.
    *H04L 61/5007* (2022.01)
    *H04J 3/06* (2006.01)

(52) U.S. Cl.
    CPC ........ *H04L 61/5007* (2022.05); *H04L 63/029* (2013.01); *H04L 63/0236* (2013.01); *H04L 63/0245* (2013.01); *H04L 63/1425* (2013.01); *H04L 63/1466* (2013.01); *H04L 63/1475* (2013.01)

(58) Field of Classification Search
    CPC ............... H04L 63/029; H04L 63/1425; H04L 63/1466; H04L 63/1475; H04J 3/0667
    See application file for complete search history.

(56) References Cited

U.S. PATENT DOCUMENTS

| | | | |
|---|---|---|---|
| 9,813,306 B1* | 11/2017 | Allen | .................. H04L 63/1458 |
| 2003/0065943 A1 | 4/2003 | Geis et al. | |
| 2003/0154399 A1 | 8/2003 | Zuk et al. | |
| 2003/0196081 A1 | 10/2003 | Savarda et al. | |
| 2005/0039042 A1* | 2/2005 | Liang | .................. H04L 63/145 |
| | | | 726/26 |
| 2005/0055399 A1 | 3/2005 | Savchuk | |
| 2005/0235352 A1 | 10/2005 | Staats et al. | |
| 2010/0085873 A1 | 4/2010 | Moons | |
| 2010/0132031 A1 | 5/2010 | Zheng | |
| 2011/0214157 A1 | 9/2011 | Korsunsky et al. | |
| 2011/0247068 A1* | 10/2011 | Tolliver | .............. H04L 63/0236 |
| | | | 726/22 |
| 2012/0042381 A1 | 2/2012 | Antonakakis et al. | |
| 2012/0198541 A1 | 8/2012 | Reeves | |
| 2012/0304244 A1 | 11/2012 | Xie et al. | |
| 2013/0031626 A1 | 1/2013 | Kim | |
| 2013/0133068 A1* | 5/2013 | Jiang | .................. H04L 63/1458 |
| | | | 726/23 |
| 2014/0115688 A1 | 4/2014 | Zuk et al. | |
| 2014/0157405 A1 | 6/2014 | Joll et al. | |
| 2015/0124840 A1 | 5/2015 | Bergeron | |
| 2015/0263966 A1* | 9/2015 | Blake | .................... H04L 47/562 |
| | | | 370/229 |
| 2016/0043865 A1 | 2/2016 | Matsakis | |
| 2017/0142144 A1* | 5/2017 | Weinberger | ......... H04L 63/1408 |

FOREIGN PATENT DOCUMENTS

| | | |
|---|---|---|
| CN | 101834864 A | 9/2010 |
| CN | 103840983 A | 6/2014 |

OTHER PUBLICATIONS

International Preliminary Report on Patentability for International Application No. PCT/US2017/012593, dated Jul. 10, 2018.

International Search Report and Written Opinion of the International Searching Authority for International Application No. PCT/US2017/012593, dated Apr. 7, 2017.

Notice of Allowance on U.S. Appl. No. 15/400,743 dated Jul. 29, 2019.

Notice of Allowance on U.S. Appl. No. 15/400,743 dated Apr. 1, 2019.

Chinese Office Action on CN 201780005884.1 dated Aug. 13, 2020.

\* cited by examiner

METHOD AND PROTECTION APPARATUS TO PREVENT MALICIOUS INFORMATION COMMUNICATION IN IP NETWORKS BY EXPLOITING BENIGN NETWORKING PROTOCOLS

RELATED APPLICATIONS

This application claims the benefit of priority as a division of U.S. Nonprovisional patent application Ser. No. 15/400,743, entitled "Method and Protection Apparatus to Prevent Malicious Information Communication in IP Networks by Exploiting Benign Networking Protocols," filed Jan. 6, 2017; which claims priority to U.S. Provisional Patent Application No. 62/276,716, entitled "Systems and Methods for Intrusion Radiation Protection," filed Jan. 8, 2016, the entirety of each of which is hereby incorporated by reference.

FIELD OF THE DISCLOSURE

This disclosure generally relates to systems and methods for securing secured networks. In particular, this disclosure relates to intrusion radiation protection for identifying and controlling ingress and egress traffic at all points of a secure network.

BACKGROUND OF THE DISCLOSURE

Access to and use of protocols such as the Domain Name System (DNS), Internet Control Message Protocol (ICMP), Network Time Protocol (NTP), and Simple Network Time Protocol (SNTP) are necessary to proper network operation. Such traffic was traditionally considered 'safe' from malicious internet activity, and was therefore allowed to flow freely in and out of secure networks. Recently, however, bad actors have employed these protocols to tunnel information through secure network firewalls. Preventing malicious data exfiltration thus requires monitoring traffic in these protocols, and in outgoing traffic in particular.

SUMMARY OF THE DISCLOSURE

The present disclosure provides multiple systems and methods for detecting and preventing data exfiltration, while still allowing access to important protocols and services. In a first aspect of the present disclosure, a system can use deep packet inspection to analyze any tunneling attempts on the back of DNS, ICMP, NTP, and SNTP messages. For example, a DNS request can carry additional data. The system can inspect the DNS request to determine whether it is coming from a proper source, going to a proper destination, and is formatted correctly. In addition, the system can send a parallel query to a known and trusted DNS server and verify the result. In another example, ICMP error messages can also carry additional data. However, only the first 20 bytes of the header are important, thus the system can block, remove, or replace the additional data. In instances where the system replaces the payload, the system can check whether the recipient responds correctly. In all cases, the system can build a statistical model to estimate whether a particular message is likely to be malicious, and filter it accordingly. The system can filter both requests and responses. The system can include the following components: (1) a packet classifier unit to classify packets pertaining to different data services and data flows, (2) a context builder unit to build flow and service context to handle classified traffic within the context paradigm, and (3) a packet handler unit that can perform pre-defined actions on packets classified by the classifier and within the context of the packet contents. Such actions can include allowing the packet, disregarding or dropping the packet, logging or saving the packet, and selectively modifying the packet.

In a second aspect of the present disclosure, the system can analyze IP packets to determine the validity of the IP payload and replace all or part of the payload with either user-defined or algorithm-determined data. The system can employ a scalable framework to include and build the algorithm tree based on higher layer protocols encapsulated within the IP packet. The system can also validate the responses to modified packets.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
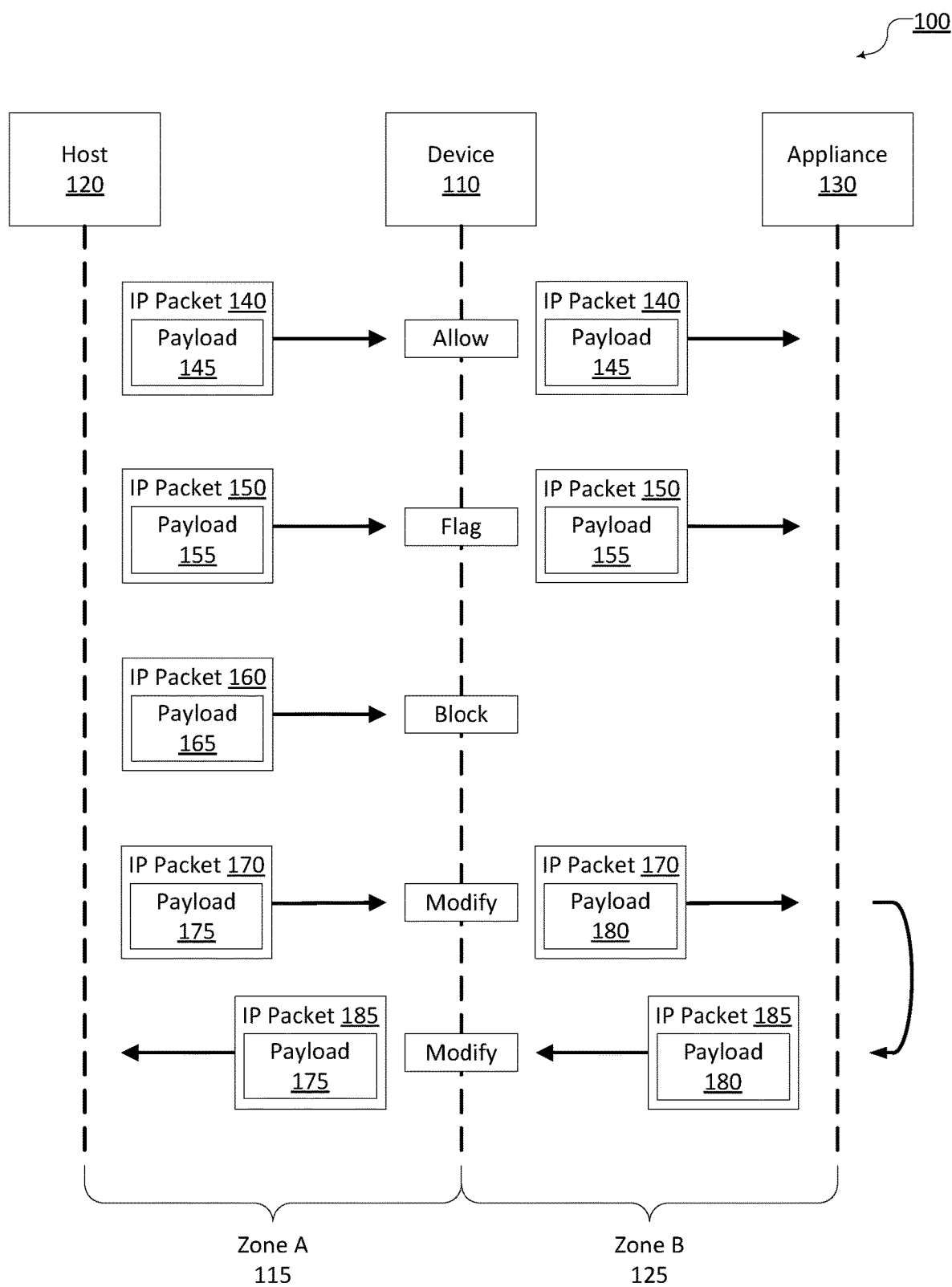
FIG. 1 is an illustration of intrusion radiation protection, according to one implementation.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for intrusion radiation protection; and Section B describes a network environment and computing environment which may be useful for practicing embodiments described herein.

A. Intrusion Radiation Protection

In any network deployment, security risk is not limited to attacks from external networks; rather it is necessary to consider risks from within the network as well. Traditionally, network security has been designed to prevent attacks from outside the network deployment. Such attacks are often referred to as Network Intrusion.

If any element or host within the internal network is compromised, it could threaten the entire network. An attacker can take control of the network, disrupt it to varying degrees, and even convey proprietary/sensitive information to external entity (referred to as Exfiltration). The compromised information could be conveyed outside the secure/trusted network. An attacker could also use the compromised element to tunnel communication into and out of the network under a Command-and-Control model. Such attacks are often referred to as Information Radiation. Preventing such attacks requires inspecting and profiling all traffic passing through the network deployment.

Intrusion Radiation Prevention (IRP) is a comprehensive framework for prevention of network-originated Network Intrusion as well as Information Radiation from a compromised network. Both Network Intrusion and Information Radiation can be accomplished in a number of ways. Attacks could circumvent the existing protection mechanisms by tunneling or piggy backing data on well-known or commonly used protocols essential to network operation. This can be prevented by analyzing the traffic based on certain measurements. For example: if packet length for a packet data unit (PDU) is greater than the expected length, or, if the packet frequency of certain PDUs is higher than usual, if the payload portion of the packet does not conform to its underlying protocol, or if the destination IP of the traffic is to an unknown or unauthorized location, such behavior may be treated as anomalous and possibly malicious.

With the introduction of IRP, network administrators can monitor events occurring in their network and analyze them for violations or traffic anomalies. The system can detect, prevent, and record security incidents based on provisioned logic and heuristics. IRP can include the Deep Packet Inspection (DPI) in its implementation. IRP can monitor and enforce policies on ingress and egress traffic. Historically, such protections were limited to ingress traffic. IRP adds the concept of identification and protection against invalid or unauthorized egress traffic.

Information can be conveyed (Intrusion/Poisoning or Radiation), by tunneling or encapsulating information as payloads for PDUs for those protocols that have no direct relation to the information being conveyed. Standard security appliances commonly ignore data as payload for a known protocol as benign, such as network time protocol (NTP), domain name system (DNS), and internet command message protocol (ICMP). Secure tunneling (via an HTTPS or VPN encrypted tunnel) can also be a mechanism of information radiation. The following paragraphs describe some common techniques used for protection against information radiation in networks.

ICMP tunneling works by injecting arbitrary data into an ICMP Echo Request/Reply packet sent to a remote computer. Information can be radiated via this data; e.g., inserting proprietary information/command control message in the Request/Reply. In the Command-and-Control model, the reply packet can contain commands to be executed by a compromised element or host.

DNS is a widely used protocol in IP networks and a staple of the Internet backbone. DNS allows applications such as web browsers to function based on domain names rather than numeric IP addresses. A DNS message can have multiple variable-length textual parts which may be exploited to tunnel both textual information and complete datagrams. An attacker could maliciously use DNS tunnels for information radiation from trusted networks. Widespread use of DNS increases the risk to a network that does not have mechanism to inspect and secure DNS traffic.

Network Time Protocol (NTP) and Simple Network Time Protocol (SNTP) are used by different machines connected to the network synchronize their clocks over IP. These protocols are prone to reflection/amplification attacks in which an external host/machine replies to an SNTP request packet with a spoofed source IP address or invalid payload. Further, one of SNTP's built-in commands allows for sending of a long reply to a short request. This could be used by attackers for DDoS attacks or CC communication. These attacks are generally achieved using "monlist" command of an NTP sever which is used by the server for monitoring purposes. As part of IRP, SNTP packets with a "monlist" command can be prevented from passing through the system. In addition, the system can inspect different fields of SNTP PDUs such as stratum value and root delay value to prevent unusual information exchange.

Routers implementing IRP can support the following security features:

1. Stateful firewall and Network Address Translation.
   Create and manage security zones by assigning security-levels to a logical/physical interface.
   Maintain Access Control Lists (ACLs) to control what traffic is allowed to pass from lower to higher security zones. These rules can be applied on INBOUND/OUTBOUND traffic.
   Use Object Groups (Network/Service/ICMP/Protocol) to manage related network devices and services.
2. VPN over IPsec Routers implementing IRP can support additional security features such as zones. A security zone is a well-established network security concept (e.g., ISA-62443). A zone can represent a network as a configurable object in the software.

Routers implementing IRP, in order to provide an ease of configuration and management of the complete security framework, can present a Unified Security Configuration Interface (USCI). USCI can enable the administrator to create a complete security profile to cover classification, action and reporting of all traffic being routed between all the zones configured on a node.

On the abstract level, the administrator can enable the security on the device and the device security can function based on the default security profile. If the administrator wants to modify the default profile, he can be allowed to modify it at each level. The administrator can also allow creating new security profile and attaching the same new security profile between zones.

The USCI can show the administrator the device with available ports. By clicking on the port, the administrator can configure logical interface on the port and assign the interface into a zone.

When the administrator selects a particular zone, he can define security for ingress and egress of those zones. The administrator can add or delete the default allowed protocols on ingress and egress. The administrator can modify the zone's security level.

When the administrator selects a protocol, he can be taken to the next detailed level of configuration hierarchy to configure and modify the rules and corresponding actions. The administrator can also define exceptions out of a global rule for a security zone.

For example if the administrator clicks on ICMP, he can configure ICMP specific rules; he can create a rule, or select an existing rule and modify values and define actions against it.

The administrator can select from the following available actions on the traffic: drop, allow. For each action, the system can log and alert the event.

Inter-zone traffic flow can be configured by selecting two zones. This type of configuration allows the administrator to define traffic behavior between two security zones. More specific configuration and rule creation for a particular appliance can be done at this level. The administrator can define exceptional rules or more generic rules.

For example: Suppose a DNS rule is created between two zones. The administrator can set a generic rule for DNS that dictates that all traffic with hostname size bigger than 52 going out from zone 1 should be drooped. The administrator can also set an exceptional rule that DNS queries of hostnames up to size 62 for a particular IP/IP range or subnet in that zone should be allowed. The second rule can supersede the first rule, and if the DNS packet falls in the exception, then action according to that exception can be performed and the generic rule can be disregarded.

IRP can be further enhanced to implement:

1. Detection of general traffic anomalies by classifying IPv4 traffic on the basis of IP packet parameters such as payload length and frequency (number of packets per unit time), destination or source. The system can then perform the configured actions (allow, drop, modify-and-allow, forward to another appliance for deep packet inspection, etc.) on these packets. Along with the actions, the system may log the action and packet variables, and/or trigger additional events based on the system configuration. The source of a packet is one of the classifications to be considered since it is possible to identify that a certain component within a network should not be communicating outside of the network.

2. Detection of deeper and persistent threats for specific protocols like SNTP, DNS, ICMP, etc., and performing requisite configured actions (logging/dropping etc.) on these packets. For instance, the IRP framework can allow classification of DNS traffic; if DNS packets from a Zone exceed the configured threshold value, a configured Action will be taken.

Firewalls can be used to control/restrict traffic based on ACLs. These rules can be based on source and destination networks for all or specified protocols. An existing Firewall-ACL can act as the base filter for IRP. For instance, zone-level allow/drop restrictions can translate to firewall rules.

Blacklists and Whitelists can be used to create exception list to the general rules. The administrator can block a specific IP from an allowed inter-zone flow using a Blacklist. For example, ICMP traffic from 10.1.1.0/24 is allowed by zone configuration. The administrator monitoring IRP logs may find that a particular host (say 10.1.1.10) is sending a large number of unsolicited ICMP Echo Reply messages. The administrator can add that specific IP to the Blacklist and all traffic from that particular host shall be blocked or monitored as per configured actions.

Similarly, the administrator can allow traffic to/from/between specific hosts where general traffic is blocked. The administrator can add that host IP address to the Whitelist. For example, traffic from 20.1.1.0/24 is blocked by the zone configuration; however a particular host (e.g., 20.1.1.5) may require access to other networks. The administrator can then add this particular host to the Whitelist.

Traffic Anomaly Detection and Prevention

First level traffic anomaly detection can work on basic packet parameters such as Protocol Number, Payload Length, Frequency, or Bandwidth. The next level of detection shall be implemented as protocol specific Security Appliances comprising of packet decoders, analyzers and threat response mechanisms.

Prevention of ICMP Tunneling

The brute force method to prevent tunneling is to block ICMP traffic altogether, but this is not realistic for certain environments that rely on ICMP traffic. Another method for mitigating this type of attack is to only allow fixed sized ICMP packets through firewalls, which can impede or eliminate this type of behavior, but is similarly not practical.

The IRP system can work with a number of Message and Payload parameters and keep track of ICMP flow contexts using DPI to analyze the traffic for threats including unsolicited responses.

For instance:
1. Classification and action based on ICMP code & ICMP type;
2. Classification and action based on length of messages;
3. Prevent Unsolicited response; and
4. Classification and action based on rate of ICMP messages received.

To prevent Information Radiation exploiting the variable data segments of the Message, the system can implement the facility of recording then overwriting part or all of data segment with zeros, thereby rendering the Radiation attack useless. Note, it is necessary to intercept the ICMP reply packet and then restore the payload to what is expected by the original initiator.

Prevention of DNS Tunneling

The IRP system can analyze the payload of a DNS packet and shall implement different prevention mechanism based on:

1. Size of DNS request and response packets;
2. Entropy of hostnames;
3. Statistical Analysis: Looking at the percentage of the length of the Longest Meaningful Sub string;
4. Specific Signatures: filter list of known-good and known-bad signatures;
5. Volume of DNS traffic per IP address;
6. Volume of DNS traffic per domain;
7. Volume of Non-existent Domain responses;
8. Tracking DNS flows and filtering unsolicited DNS responses; and
9. Proper protocol formatting of the packet payload.

Prevention of SNTP-Based Attacks, Such as Reflection Attacks

The IRP system can analyze SNTP messages for certain Message Types and Commands such as "monlist" command. If such commands are required for normal operation of the network, the system can modify certain messages based on user configured thresholds. Classification of traffic can be performed using different fields of SNTP packets such as stratum value and root delay value. In addition, DPI can be performed to validate the payload of SNTP packets conform to the SNTP protocol.

FIG. 1 is a swim lane diagram illustrating an implementation of intrusion radiation protection. Intrusion radiation protection can be performed by a device 110, which can be an edge device between two or more networks or network zones, such as Zone A 115 and Zone B 125. Zone A 115 and Zone B 125 can be different zones of a secure network. Alternatively, Zone A 115 can be a secure network and Zone B 125 can be an unsecured network, such as the Internet. The device 110 can be a switch, router, server, appliance, virtual appliances (e.g. virtual machines executed by one or more physical machines), device clusters, cloud devices, or any other networked computing device. The device 110 can connect one or more hosts 120 with one or more appliances 130. The device 110 can implement the methods of intrusion radiation protection described herein. Although referred to as a host 120 and appliance 130 in the example illustrated, each host 120 and appliance 130 may be any type and form of computing devices, including without limitation appliances, mobile devices, desktop computers, laptop computers, smart phones, tablets, workstations, servers, virtual machines executed by physical computing devices, or any other type and form of device. Similarly, an appliance 130 may 'host' a communication, server, or session, and host 120 may be a client device. Accordingly, devices 110, 120, and 130 may be generally considered "computing devices" and may fulfill various roles of hosts, clients, servers, or intermediaries depending on the topology and session.

The device 110 can route data packets back and forth between the host 120 and the appliance 130. In doing so, the device 110 can apply policies and perform checks on the IP traffic to detect and/or block malicious activity. The diagram 100 illustrates several examples of how the device 110 can implement intrusion radiation protection. In the first example, the host 120 can transmit an IP packet 140, carrying a payload 145, to the appliance 130 via the device 110. The device 110 can receive and classify the IP packet 140 according to predetermined policy. Depending on the classification of the IP packet 140, the device 110 can inspect the IP packet 140 and the payload 145; for example, a source, destination, and format of the IP packet 140 and the payload 145. If the device 110 determines that the relevant characteristics of the IP packet 140 and the payload 145 are proper, it can transmit them to the appliance 130.

In a second example, the device 110 can receive an IP packet 150 and a payload 155 from the host 120. The device can receive and classify the IP packet 150 according to a predetermined policy. The device 110 may then inspect, responsive to the classification, the IP packet 150 and the payload 155. If the device 110 determines that a characteristic of the IP packet 150 or the payload 155 is improper, it can flag the IP packet 155. The flag can mark the IP packet 150 as suspicious and possibly indicative of malicious network activity. The device 110 can then log the IP packet 150 before transmitting it to its destination.

In a third example, the device 110 can receive an IP packet 160 and a payload 165 from the host 120. The device can receive and classify the IP packet 160 according to a predetermined policy. The device 110 may then inspect, responsive to the classification, the IP packet 160 and the payload 165. If the device 110 determines that a characteristic of the IP packet 160 or the payload 165 is improper, it can flag the IP packet 160. The flag can mark the IP packet 160 as suspicious and possibly indicative of malicious network activity. The device 110 can then block or drop the IP packet 150 instead of transmitting it to its destination.

In a fourth example, the device 110 can receive an IP packet 170 and a payload 175 from the host 120. The device can receive and classify the IP packet 170 according to a predetermined policy. The device 110 may then inspect, responsive to the classification, the IP packet 170 and the payload 175. If the device 110 determines that a characteristic of the IP packet 170 or the payload 175 is improper, it can flag the IP packet 170. The flag can mark the IP packet 170 as suspicious and possibly indicative of malicious network activity. In this example, the device 110 may determine that the payload 175 is somehow improper; e.g., the device 110 may determine that the payload 175 contains data improper for the protocol or purpose of the IP packet 170. The device 110 may, responsive to the determination that the payload 175 is improper, replace the payload 175 with a new payload 180. The new payload 180 may be a null payload (e.g., with a field of all zeros), an algorithm-determined payload, a random or pseudo-random payload, or a predetermined payload. In some implementations, the new payload 180 may be a portion of payload 175, such as a truncated payload (e.g. the first 16 bits of payload 175, or any other such amount). Such implementations may be useful in cases of overflow attacks (e.g. long DNS queries with additional, improper data included in the query string) by truncating the payload to an expected length. The device 110 may log the IP packet 170 with data regarding the payload replacement. The device 110 may transmit the IP packet 170 carrying the new payload 180 to the appliance 130. When the device 110 receives a response to the IP packet 170 from the appliance 130 in the form of IP packet 185, the device 110 may replace the payload 180 of the IP packet 185 with the original payload 175. The device 110 may again log the response IP packet 185, and transmit the IP packet 185 to the host.

Figure 2:
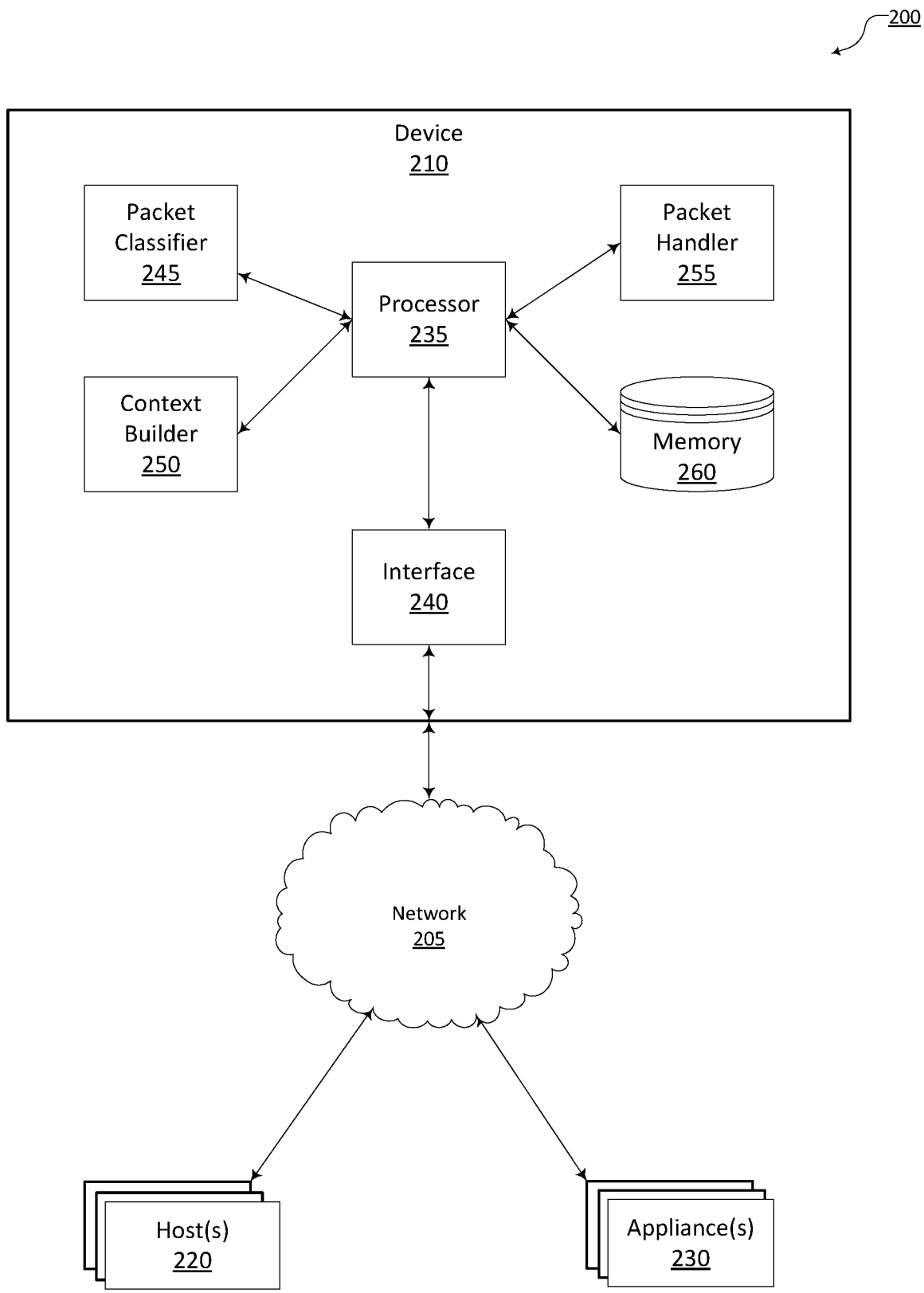
FIG. 2 is a block diagram of an example implementation of a device for intrusion radiation protection.

FIG. 2 is a block diagram of an implementation of a device 210 for intrusion radiation protection, according to one implementation. The device 210 can be similar to the device 110 described in FIG. 1, and may include a switch, router, server, appliance, or any other networked computing device. The device 210 may communicate with hosts 220 and appliances 230 via a network 205. Although shown deployed separately from hosts 220 and appliances 230, in some implementations, device 210 may be deployed as an intermediary between hosts 220 and appliances 230 (e.g. between network 205 and one or more appliances 230, such as when deployed as a gateway or load balancer for a cloud of servers). The device may include a processor 235, an interface 240, a packet classifier 245, a context builder 250, a packet handler 255, and a memory 260. While shown as separate functional modules in FIG. 2, in some implementations, the functionality of two or more of the modules may be combined into one or more larger, more comprehensive modules.

The processor 235 can be of any single- or multi-core unit suitable for performing the operations described herein. The processor 235 can be of the type described with respect to CPU 521 in FIG. 5B or 5C. The processor 235 can communicate with the packet classifier 245, the context builder 250, the packet handler 255, and the memory 260. The processor 235 can communicate with the interface 240 to send and receive data to and from the hosts 220 and appliances 230 in the system via the network 205.

The interface 240 can connect the processor 235 with the network 205, and transmit and receive data to and from the network 205. The interface 240 can transmit data to and from the hosts 220 and the appliances 230. Although the device 210 is illustrated here as communicating with the hosts 220 and appliances 230 over a single network 205, the device 210 may be an edge device that transmits traffic between two distinct zones of a network, or between two distinct networks such as a secured network and an unsecured network. Thus, in some implementations the interface 240 can be connected to two or more networks or network zones. In some implementations the interface 240 can comprise a plurality of network adapters communicating over a single network or multiple networks.

The packet classifier 245 can classify IP packets pertaining to different data services and data flows transmitted from and routed to different networks as received at the device 210. The packet classifier 245 can classify IP packets based on a protocol (e.g., Domain Name System (DNS), Internet Control Message Protocol (ICMP), Network Time Protocol (NTP), and Simple Network Time Protocol (SNTP)) and a size of the IP packet according to a predetermined policy. The packet classifier 245 can classify the IP packets as warranting deep packet inspection if the IP packet is of a certain protocol and is greater than a certain size for a given protocol. Small DNS packets are likely to be part of normal network traffic while unusually large DNS packets may be vectors for malicious infiltration or exfiltration of data. For example, the IP packet classifier 245 may classify a DNS packet having a size of 128 bytes as not warranting inspection while classifying a DNS packet having a size of 1 kilobyte or more as warranting inspection. The packet classifier 245 may apply a policy with a predetermined threshold for packet size for each protocol of interest. The packet classifier 245 may apply an adaptive policy that adjusts the threshold packet size based on observed patterns of network traffic. The threshold packet size may be different for each network protocol.

The context builder 250 can build flow and service context to handle classified traffic within the context paradigm. The context builder 250 can use deep packet inspection to identify contexts in IP packets. Identifiable contexts include packet properties such as source IP, destination IP, and format. The context builder 250 can identify the source IP of an IP packet and determine whether it is proper. For example, a database server may be unlikely to issue DNS requests. Similarly, computers outside of a network zone may be unlikely to issue NTP requests to servers within the network zone. The context builder 250 can identify the destination IP of an IP packet and determine whether it is proper. For example, the context builder 250 can identify when DNS requests are sent to servers the do not perform DNS resolution. The context builder 250 can identify the format of an IP packet and determine whether it is proper. For example, the context builder 250 can to validate that the payload of SNTP packets conform to the SNTP protocol.

The context builder 250 can identify additional properties specific to each protocol. For example, for ICMP packets, the context builder 250 may analyze ICMP code, ICMP type, and message length. For DNS packets, the context builder 250 may analyze a size of the request or response, whether it conforms to a list of known-good or known-bad signatures, and formatting of the packet payload. For NTP and SNTP packets, the context builder 250 may analyze message types, commands, and fields of the packet such as stratum value and root delay value.

The context builder 250 can identify correlations and trends over time. For example, the context builder 250 can identify whether an ICMP response was solicited or unsolicited, and whether a rate of ICMP messages received indicates suspicious activity. For DNS packets, the context builder 250 can monitor an entropy of host names, volume of DNS traffic per IP address, volume of DNS traffic per domain, and volume of non-existent domain responses. For NTP and SNTP packets, the context builder 250 may analyze the fields of the packet such as stratum value and root delay value, and determine whether they are varying over time from individual hosts 220 or appliances 230, which may indicate suspicious activity.

The packet handler 255 can perform pre-defined actions on packets classified by the classifier and within the context of the packet contents. Such actions can include allowing the packet, disregarding or dropping the packet, logging the packet, saving a copy of the packet, and selectively modifying the packet. The packet handler 255 can selectively modify the packet in several ways. For example, the packet handler 255 can truncate a payload; replace the payload with null data, predetermined data, or algorithm-determined data; or remove the payload. The packet handler 255 can perform related operations on related packets. For example, the packet handler 255 can remove or replace the payload of a request packet traveling from a host 220 to an appliance 230, and then restore the original payload of a subsequent response packet traveling from the appliance 230 to the host 220.

The memory 260 can include any non-transitory, volatile or non-volatile memory element or device. The memory 260 can include any or all of the memory elements described in FIGS. 5B and 5C such as a main memory 522, storage 528, and cache 540. The memory 260 can store instructions executable by the processor for performing the operations described herein. The memory 260 can store additional data for performing these operations, such as packet signatures, and thresholds, parameters, and rules and policies for classifying and modifying packets. The memory 260 can store log information related to flagged packets, blocked packets, and modified packets. The memory 260 can also store state information for related packets, such as request/response pairs.

Although shown and discussed above as a physical device, in many implementations, device 210 may be a virtual device or virtual machine executed by a hypervisor of a physical machine. In other implementations, device 210 may be divided among a plurality of devices (e.g. an appliance cluster), and may thus include one or more of the illustrated components in a plurality of physical devices.

Figure 3:
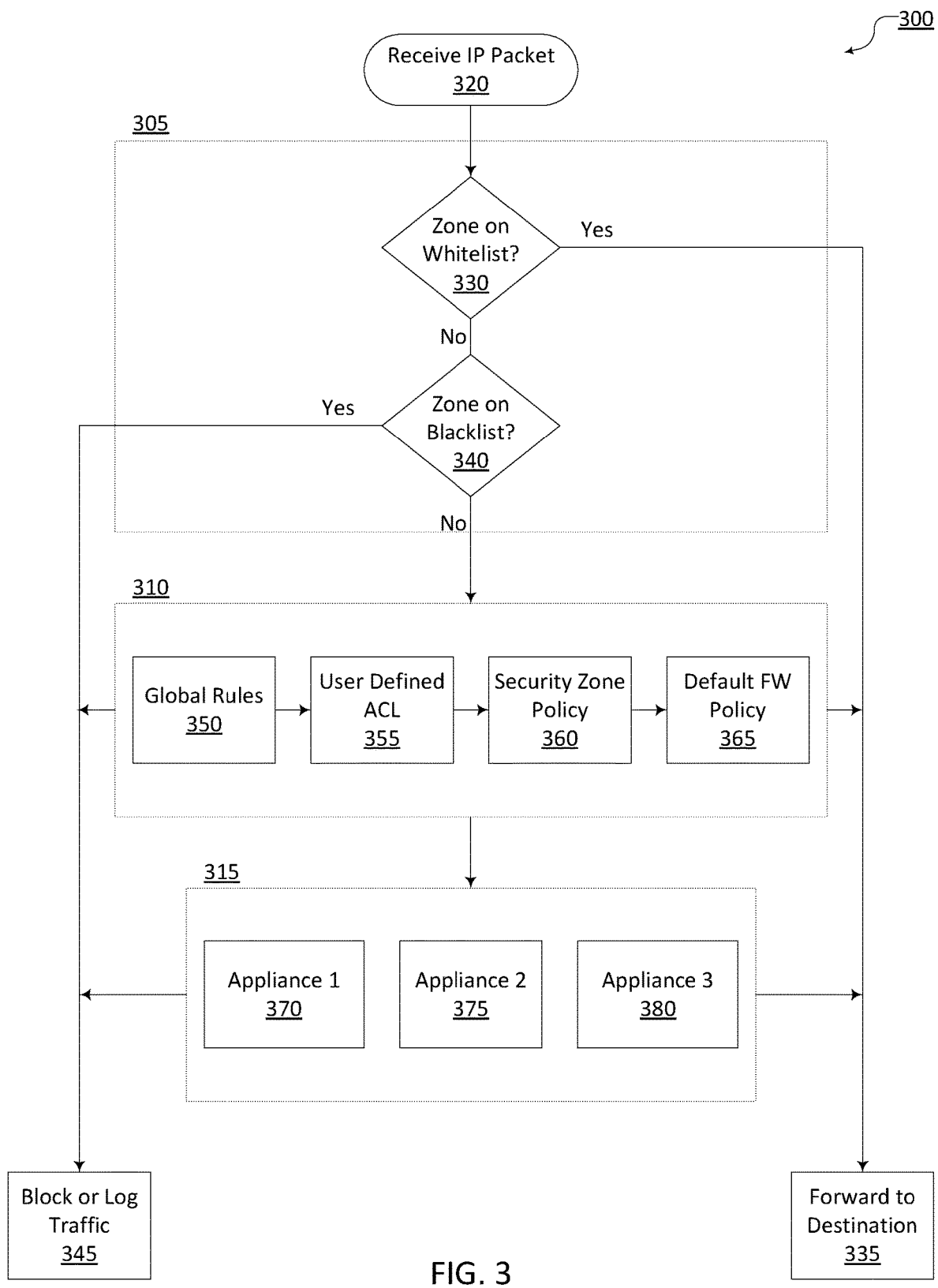
FIG. 3 is a flow chart of a method of intrusion radiation protection, according to one implementation.

FIG. 3 is a flow chart of a method 300 of intrusion radiation protection, according to one implementation. User-defined policies can be configured into a classification hierarchy, such as a decision tree; i.e., more generic policies at the top level and more specific policies at the leaves of the hierarchy. The classification logic can be based on packet properties like source IP, destination IP, protocol type, packet length, etc. The method 300 can be implemented by a device such as the device 110 described in FIG. 1 or the device 210 described in FIG. 2. The method 300 can include three levels of a classification hierarchy: whitelist and black list processing 305, global and default security policies 310, and appliance processing 315. Within each level of the hierarchy lie individual policies appropriate for that level of classification.

The whitelist and blacklist processing 305 are the first level of the hierarchical classification. The whitelist and blacklist processing 305 can apply zone-specific classification and control of packet traffic. The device can receive an IP packet (Step 320). The device can identify whether a security policy generally allows traffic from the zone where the IP packet originated; i.e., the zone appears in a whitelist (Step 330). A whitelist may comprise a list, table, array, flat file, database, or any other type and form of data structure for storing one or more IP addresses or ranges of addresses, and may be stored in a memory of the device. In some implementations, the whitelist may be populated by an administrator of the system. In many implementations, the whitelist may include wildcards for a portion of an address. The device can forward any IP packet from a zone appearing in the whitelist to its destination (Step 335). The device can identify whether a security policy generally blocks traffic from the zone where the IP packet originated; i.e., the zone appears in a blacklist (Step 340). The blacklist may similarly comprise a list, table, array, flat file, database, or any other type and form of data structure for storing one or more IP addresses or ranges of addresses, and may be stored in a memory of the device. In some implementations, the blacklist may be populated by an administrator of the system, while in other implementations, the blacklist may be automatically populated by the device, such as in response to detection of a packet matching a detection policy (e.g. an improper query or including a suspect or malicious payload). In many implementations, the blacklist may include wildcards for a portion of an address. The whitelist and blacklist processing 305 can apply whitelists and blacklists at the granular, host level. For example, traffic from a zone may be generally allowed while a blacklist can indicate that traffic from one or more particular hosts within the zone should be blocked. Similarly, traffic from a zone may be generally blocked while a whitelist can indicate that traffic from one or more particular hosts within the zone should be allowed. The device can log, block, and/or drop any IP packet from a zone appearing in the blacklist (Step 345). The device can forward any IP packets from zone not appearing in either the whitelist or the blacklist on to the next level of classification.

The global and default security policies 310 are the second level of the hierarchical classification. The global and default security policies 310 can process IP packets from zones not generally allowed or blocked based on the whitelists and blacklists. The global default security policies 310 can process IP packets in the following sequence according to a classification hierarchy: global rules (Step 350), user-defined Access Control Lists (ACLs) (Step 355), security zone policy (Step 360), and default Firewall (FW) policy (Step 365). In other implementations, the rules and policies may be applied in other sequences. If the device determines that the IP packet matches any classification logic in a classification hierarchy, the configured action can be taken and further processing of the packet in that classification hierarchy stops. If the device determines that the IP packet is marked as dropped, the device will drop it in the egress (Step 345). If the action for the packet is to allow it in that classification hierarchy, the device can forward the packet. In some implementations, packets may not match allow or drop rules within the security policies classification hierarchy 310, and/or may match a rule requiring further inspection or processing of the packet, such as deep packet inspection, decryption, or other features performed by one or more appliances. The policy rules may identify an appliance (which may be a virtual appliance or module within a single device) to which the packet should be forwarded for further processing at hierarchy level 315.

The appliance processing 315 is the third level of the hierarchical system. In appliance processing 315, the device can send the IP packet to the appropriate appliance for further processing, based off one or more forwarding, processing, or inspection rules. Once processed, the appliance may forward or drop the packet, as discussed above.

With Intrusion Radiation Protection in place, network traffic can be constantly monitored. An intruder can therefore be prevented from piggy backing on, or tunneling data through, the supported networking protocols. By activating Intrusion Radiation Protection in a system:
  The administrator can enforce well-defined security profiles on network traffic to provide better control over the forwarding of traffic;
  Based on the applied configuration, the system can generate logs and alerts to notify the administrator of anomalies;
  The administrator can identify probes, attacks, exploits and other vulnerabilities with the help of performance monitoring statistics maintained by the system; and
  The administrator can analyze the intrusion attempts offline using logs maintained by the system.

Figure 4A:
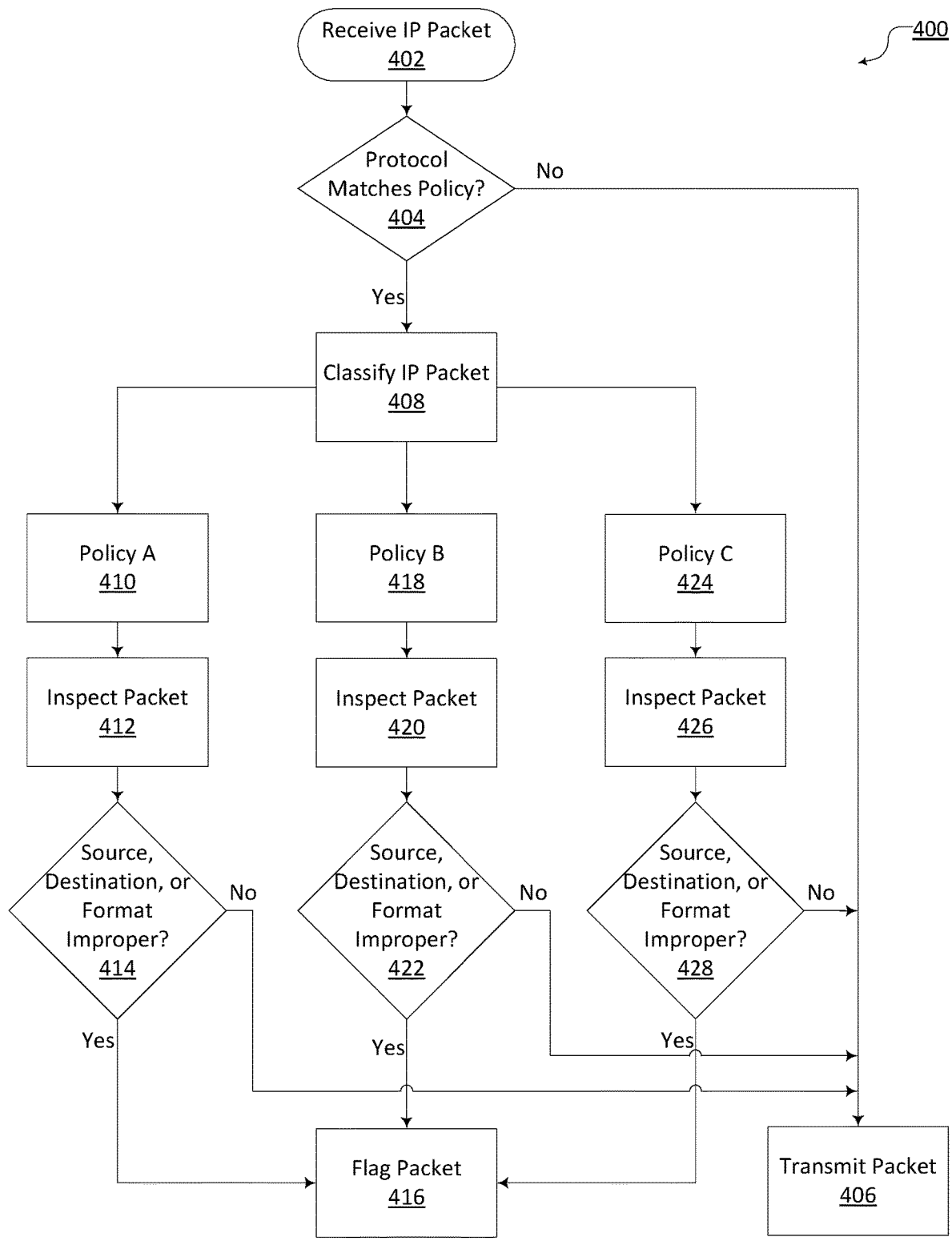
FIG. 4A is a flow chart of a method of intrusion radiation protection, according to one implementation.

FIG. 4A is a flow chart of a method 400 of intrusion radiation protection, according to one implementation. The method 400 can detect malicious IP traffic in a secure network. The method 400 can include receiving, at a device of a first network zone, an IP packet (Step 402). The method 400 can include determining, by a processor of the device, that a protocol if the IP packet matches a predetermined policy of a plurality of predetermined policies (Step 404). The method 400 can include transmitting the IP packet to its final destination if the IP packet does not match one of the plurality of predetermined policies (Step 406). The method 400 can include classifying, by the processor, the IP packet responsive to the determination that the IP packet matches the predetermined policy (Step 408). The method 400 can include classifying the IP Packet to one of the predetermined policies; e.g., Policy A (Step 410), Policy B (Step 418), or Policy C (Step 424). The method 400 can include inspecting, by the processor, a payload of the IP packet responsive to the classification and according to the predetermined policy (Steps 412, 420, and 426). The method 400 can include determining, by the processor, that one of the source, the destination, or the format is improper based on the classification and the predetermined policy (Steps 414, 422, and 428). The method 400 can include flagging, by the processor, the IP packet as suspect based on the determination (Step 416).

The method 400 can include receiving, at a device of a first network zone, an IP packet (Step 402). The method 400 can be implemented by a device such as the device 110 described in FIG. 1 or the device 210 described in FIG. 2. The device can be an edge device between two network zones such as Zone A 115 or Zone B 125 as described in FIG. 1. The device can be an edge device between a secure network and an unsecured network. The device can receive the IP packet from a host such as host 120 or 220, and the IP packet can be destined for an appliance such as appliance 130 or 230, as described in FIGS. 1 and 2.

The method 400 can include determining, by a processor of the device, that a protocol of the IP packet matches a predetermined policy of a plurality of predetermined policies (Step 404). For example, the security settings for the device may have predetermined policies in place for packets of the DNS, ICMP, NTP, SNTP, etc. protocols. The method 400 can determine that the IP packet received in Step 402 matches one of these predetermined policies.

The method 400 can include classifying, by the processor, the IP packet (Step 408). The method 400 can include classifying the IP Packet to one of the predetermined policies; e.g., Policy A (Step 410), Policy B (Step 418), or Policy C (Step 424). The method 400 can classify the IP packets as warranting deep packet inspection if the IP packet is greater than a size threshold dictated by the predetermined policy matching the IP packet. IP packets below the size threshold can be assumed to pose little risk of malicious data infiltration or exfiltration. IP packets greater than the size threshold can be further inspected for evidence of malicious activity. For example, Policy A may apply to DNS packets, and may have a size threshold of 256 bytes, Policy B may apply to ICMP packets and have a size threshold of 128 bytes. Policy C may apply to NTP and SNTP packets and have a size threshold of 64 bytes. Each size threshold can be set higher or lower according to network conditions and expected packet sizes. If the size of the IP packet does not exceed the size threshold for the predetermined policy, the device can pass the IP packet on to its final destination. If the size of the IP packet exceeds the size threshold for the predetermined policy, the device can perform additional inspection of the IP packet including deep packet inspection.

The method 400 can include inspecting, by the processor, a payload of the IP packet responsive to the classification (Steps 412, 420, and 426). The method 400 can include determining, by the processor, that one of the source, the destination, or the format is improper based on the classification (Steps 414, 422, and 428). The method 400 can use deep packet inspection to determine a source, a destination, and a format of the IP packet. The method 400 can validate each of the source, destination, and format according to the predetermined policy for that IP packet.

For example, if the IP packet is a Domain Name System (DNS) packet falling under Policy A, the method 400 can inspect the packet (Step 412) and determine that the source, destination, and format of the DNS packet conform to the DNS protocol (Step 414). The method 400 can determine that the source—that is, the host sourcing the DNS packet— is one that properly issues DNS requests or responses, such as a client computing device or a DNS server. An improper source field, such as a non-existent address or one that would be expected to issue DNS requests, could indicate malicious activity. Similarly, the method 400 can determine that the DNS packet destination is one that properly receives DNS requests or responses. The destination field can also be checked against a log to verify that a DNS response packet corresponds to a valid request. Finally, the format of the DNS packet can be checked to make sure that all fields properly correspond to the DNS protocol. In addition, the DNS packet can be inspected to make sure that the payload does not include a domain name longer than a predetermined length threshold. A queried domain name or answer domain name longer than a certain length may indicate an attempt to embed data in the DNS packet for the purpose of exfiltration. Packets violating one or more parameters of the given policy for that protocol can be flagged as suspect (Step 416).

If the IP packet is an Internet Control Message Protocol (ICMP) packet falling under Policy B, the method 400 can inspect the packet (Step 420) and determine that the source, destination, and format of the ICMP packet conforms to the ICMP protocol (Step 422). The method 400 can determine that the host sourcing the ICMP packet is one that properly issues ICMP messages or responses. The destination field can also be checked against a log to verify that a ICMP response packet corresponds to a valid request. Similarly, the method 400 can determine that the ICMP packet destination is one that properly receives ICMP messages or responses. The format of the ICMP packet can be checked to make sure that all fields properly correspond to the ICMP protocol. In addition, the ICMP packet can be inspected to make sure that the payload does not include a message having a length longer than a predetermined length threshold. A message longer than a certain length may indicate an attempt to embed data in the ICMP packet for the purpose of exfiltration. Packets violating one or more parameters of the given policy for that protocol can be flagged as suspect (Step 416).

If the IP packet is one of a Network Time Protocol (NTP) or a Simple Network Time Protocol (SNTP) packet falling under Policy C, the method 400 can inspect the packet (Step 420) and determine that all fields of the IP packet conform to the NTP or SNTP protocol (Step 428). Additionally, the method 400 can inspect one or more of the fields of the IP packet, such as a stratum value or a root delay value. Detecting possible malicious activity using these values may require more information about the host that transmitted the packet. For example, a detected change in one or more fields from previous or expected values in absence of a reconfiguration of the network may indicate malicious activity.

The method 400 can include flagging, by the processor, the IP packet as suspect based on the determination that a feature of the IP packet is improper (Step 416). If the method 400 determines in one of the steps 414, 422, or 428 that a feature of the IP packet is improper, it can flag the IP packet as suspect, and subject it to additional operations. For example, the method 400 can log or save the IP packet, drop or block the IP packet, or both. The method 400 can additionally check the flagged IP packet against existing logs to determine whether it is, for example, a DNS response without a corresponding request or an ICMP echo without a corresponding message. Unsolicited responses and echoes may indicate that the IP packet has a spoofed source or destination, or a questionable origin.

Figure 4B:
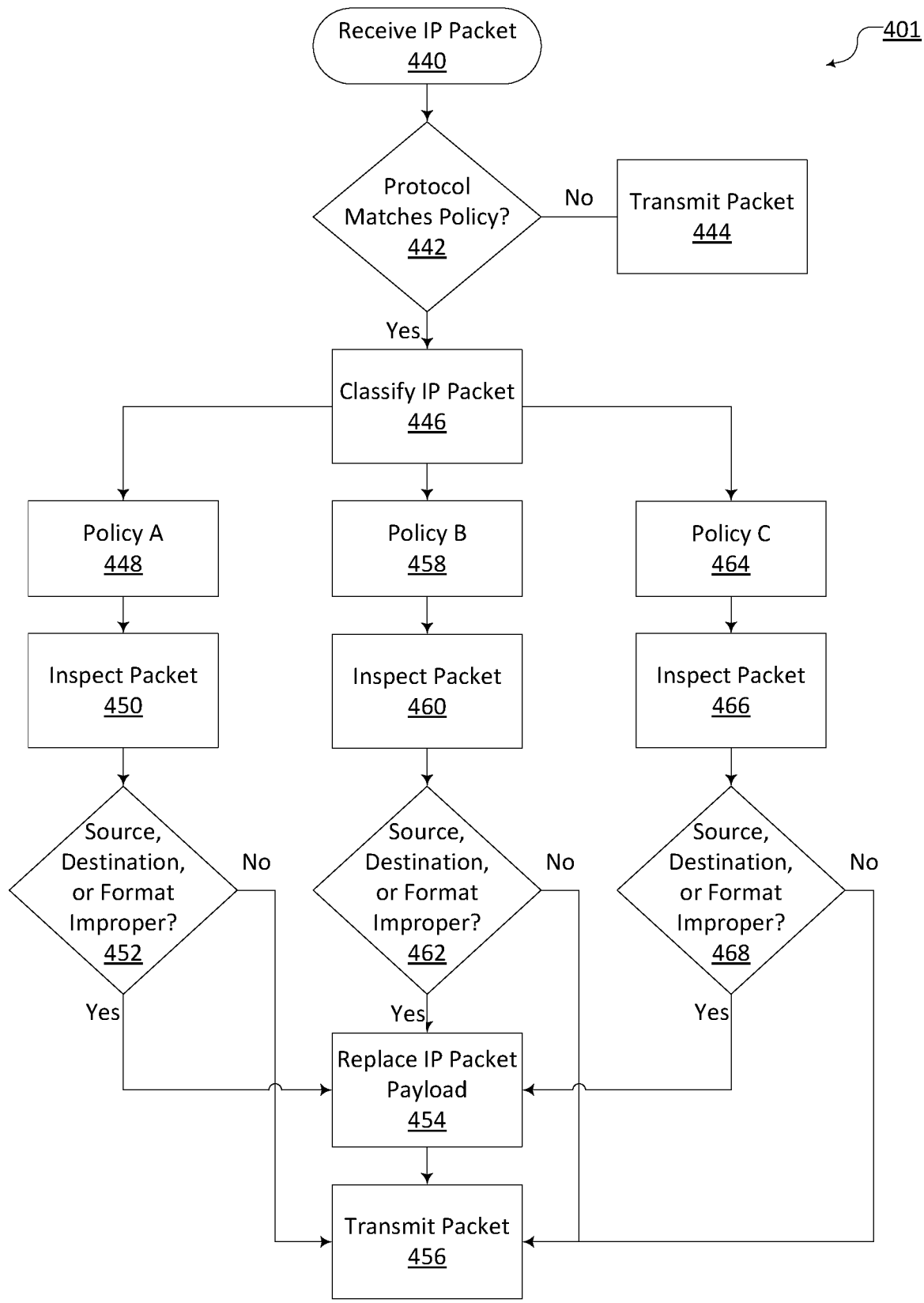
FIG. 4B is a flow chart of a method of intrusion radiation protection, according to one implementation.

FIG. 4B is a flow chart of a method 400 of intrusion radiation protection, according to one implementation. The method 401 of FIG. 4B is similar to the method 400 of FIG. 4A. The method 401 can detect malicious IP traffic in a secure network. The method 401 can include receiving, at a device of a first network zone, an IP packet (Step 440). The method 401 can include determining, by a processor of the device, that a protocol of the IP packet matches a predetermined policy of a plurality of predetermined policies (Step 442). The method 401 can include transmitting the IP packet to its final destination if the IP packet does not match one of the plurality of predetermined policies (Step 444). The method 401 can include classifying, by the processor, the IP packet (Step 446) responsive to the determination that the IP packet matches the predetermined policy. The method 401 can include classifying the IP Packet to one of the predetermined policies; e.g., Policy A (Step 448), Policy B (Step 458), or Policy C (Step 464). The method 401 can include inspecting, by the processor, a payload of the IP packet responsive to the classification (Steps 450, 460, and 466). The method 401 can include determining, by the processor, that one of the source, the destination, or the format is improper based on the classification (Steps 452, 462, and 468). The method 401 can include replacing, by the processor, the payload of the IP packet with a second payload (Step 454). The method 401 can include transmitting, by the processor, the IP packet to its destination (Step 456). Steps 440 to 468 are similar to the corresponding Steps 401 to 428 in FIG. 4A.

The method 401 can include replacing, by the processor, the payload of the IP packet with a second payload (Step 454). If the method 401 determines in one of the Steps 452, 462, or 468 that the IP packet has a feature deemed improper under the applicable predetermined policy, the method 401 can perform additional operations on the IP packet prior to passing it on to its destination. For example, the method 401 can replace all or part of the payload with either user-defined or algorithm-determined data. The new payload may be a null payload (e.g., with a field of all zeros), an algorithm-determined payload, or a predetermined payload. For example, if the IP packet is an Internet Control Message Protocol (ICMP) packet, the method 401 can overwrite a data segment of the payload with zeros. The device may log the IP packet along with information regarding the payload replacement.

The method 401 can include transmitting, by the processor, the IP packet to its destination (Step 456). In instances where the device replaces the payload and logs the IP packet, the device can monitor future responses to check whether the recipient responds correctly. When the device receives the response, the device can replace the payload of the response IP packet with the original payload. The device can log the response as corresponding to the original request or message, and pass the response IP packet on to its destination.

Accordingly, the systems and methods discussed herein provide various implementations of intrusion and data radiation or exfiltration prevention. In a first aspect, the present disclosure is directed to a method for preventing malicious data exfiltration from a secure network. The method can include receiving, at a device of a first network zone, a first IP packet. The method can include determining, by a processor of the device, that a first protocol and a first size of the first IP packet matches a predetermined policy of a plurality of predetermined policies. The method can include inspecting, by the processor, a first payload of the first IP packet based on the predetermined policy to identify a first source, a first destination, and a first format of the first IP packet. The method can include determining, by the processor, that one of the first source, the first destination, or the first format is improper based on the predetermined policy. The method can include flagging, by the processor, the first IP packet as suspect based on the determination. The method can include receiving, at the device, a second IP packet. The method can include determining, by the processor, that a second protocol and a second size of the second IP packet matches the predetermined policy. The method can include inspecting, by the processor, a second payload of the second IP packet based on the predetermined policy to identify a second source, a second destination, and a second format of the second IP packet. The method can include determining, by the processor, that each of the second source, the second destination, and the second format is proper based on the predetermined policy. The method can include transmitting, by the processor, the second IP packet based on the determination.

In some implementations of the method, the first network zone can be in a secure network and the device is an edge device of the secure network. In some implementations of the method, the first IP packet can be a Domain Name System (DNS) packet, and determining that the first destination is improper can comprise determining that the DNS packet is an unsolicited DNS response. In some implementations of the method, the first IP packet can be a Domain Name System (DNS) packet, and determining that the first format is improper can comprise determining that the first payload includes a domain name longer than a predetermined name length threshold.

In some implementations of the method, the first IP packet can be an Internet Control Message Protocol (ICMP) packet, and determining that the first destination is improper can comprise determining that the ICMP packet is an unsolicited ICMP response. In some implementations of the method, the first IP packet can be an Internet Control Message Protocol (ICMP) packet, and determining that the first format is improper can comprise determining that the first payload includes a message longer than a predetermined message length.

In some implementations of the method, the first IP packet can be one of a Network Time Protocol (NTP) or a Simple Network Time Protocol (SNTP) packet, and the method can further comprise inspecting a stratum value and a root delay value of the first IP packet. In some implementations of the method, the first IP packet is one of a Network Time Protocol (NTP) or a Simple Network Time Protocol (SNTP) packet, and determining that the first format is improper can comprise determining that the first format does not conform to the NTP or SNTP protocol.

In some implementations of the method, the method can include logging or dropping the first IP packet responsive to the flagging of the first IP packet as suspect. The method can further include modifying the payload of the first IP packet responsive to the flagging of the first IP packet as suspect.

In a second aspect, the present disclosure is directed to a method for preventing malicious data exfiltration from a secure network. The method can include receiving, at a device of a first network zone, a first IP packet. The method can include determining, by a processor of the device, that a first protocol and a first size of the first IP packet matches a predetermined policy of a plurality of predetermined policies. The method can include inspecting, by the processor, a first payload of the first IP packet based on the predetermined policy to identify a first source, a first destination, and a first format of the first IP packet. The method can include determining, by the processor, that one of the first source, the first destination, or the first format is improper based on the predetermined policy. The method can include replacing, by the processor, responsive to the determination, the first payload with a second payload. The method can include transmitting, by the device, the first IP packet to the first destination. The method can include receiving, at the device, a second IP packet. The method can include determining, by the processor, that a second protocol and a second size of the second IP packet matches the predetermined policy. The method can include inspecting, by the processor, a third payload of the second IP packet based on the predetermined policy to identify a second source, a second destination, and a second format of the second IP packet. The method can include determining, by the processor, that each of the second source, the second destination, and the second format is proper based on the predetermined policy. The method can include transmitting, by the processor, the second IP packet based on the determination.

In some implementations, the processor can generate the second payload by identifying protocol layers within the first IP packet and applying an algorithm.

In some implementations, the method can include determining, by the processor, that the ICMP packet is an ICMP request. The method can include receiving, at the device, an ICMP response to the ICMP request. The method can include replacing, by the processor, a payload of the ICMP response with the first payload. The method can include delivering, by the device, the ICMP response to the first source.

B. Computing and Network Environment

Having discussed specific embodiments of the present solution, it may be helpful to describe aspects of the operating environment as well as associated system components (e.g., hardware elements) in connection with the methods and systems described herein.

Figure 5A:
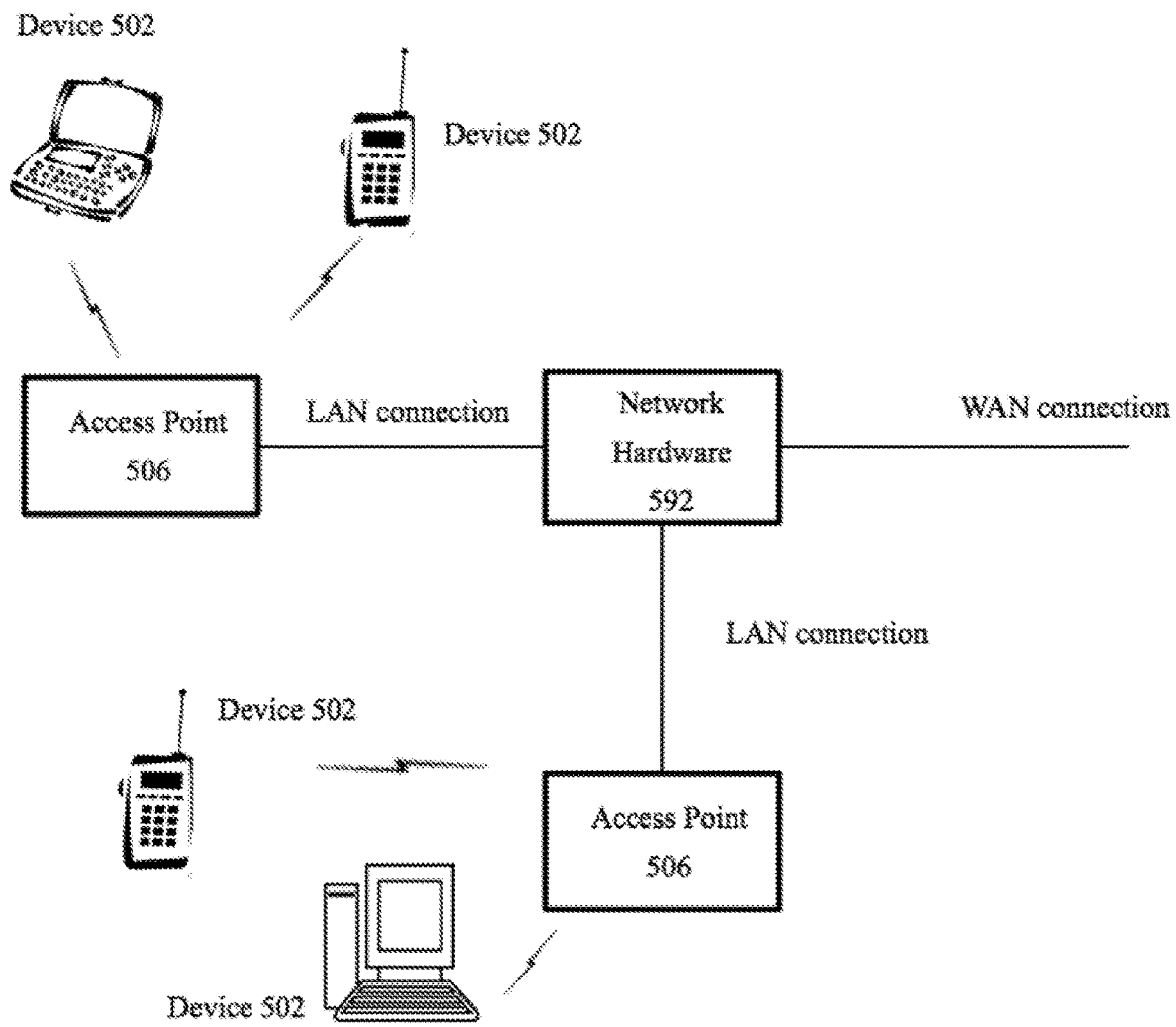
FIG. 5A is a block diagram depicting an embodiment of a network environment including one or more devices in communication with one or more devices or stations.

FIG. 5A is a block diagram depicting an embodiment of a network environment including one or more devices in communication with one or more devices or stations. In brief overview, the network environment includes a wireless communication system that includes one or more access points 506, one or more wireless communication devices 502 and a network hardware component 592. The wireless communication devices 502 may for example include laptop computers 502, tablets 502, personal computers 502 and/or cellular telephone devices 502. The details of an embodiment of each wireless communication device and/or access point are described in greater detail with reference to FIGS. 5B and 5C. The network environment can be an ad hoc network environment, an infrastructure wireless network environment, a subnet environment, etc.

The access points (APs) 506 may be operably coupled to the network hardware 592 via local area network connections. The network hardware 592, which may include a router, gateway, switch, bridge, modem, system controller, appliance, etc., may provide a local area network connection for the communication system. Each of the access points 506 may have an associated antenna or an antenna array to communicate with the wireless communication devices 502 in its area. The wireless communication devices 502 may register with a particular access point 506 to receive services from the communication system (e.g., via a SU-MIMO or MU-MIMO configuration). For direct connections (e.g., point-to-point communications), some wireless communication devices 502 may communicate directly via an allocated channel and communications protocol. Some of the wireless communication devices 502 may be mobile or relatively static with respect to the access point 506.

In some embodiments an access point 506 includes a device or module (including a combination of hardware and software) that allows wireless communication devices 502 to connect to a wired network using Wi-Fi, or other standards. An access point 506 may sometimes be referred to as an wireless access point (WAP). An access point 506 may be configured, designed and/or built for operating in a wireless local area network (WLAN). An access point 506 may connect to a router (e.g., via a wired network) as a stand-alone device in some embodiments. In other embodiments, an access point can be a component of a router. An access point 506 can provide multiple devices 502 access to a network. An access point 506 may, for example, connect to a wired Ethernet connection and provide wireless connections using radio frequency links for other devices 502 to utilize that wired connection. An access point 506 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 506 may be used for (e.g., in-home or in-building) wireless networks (e.g., IEEE 802.11, Bluetooth, ZigBee, any other type of radio frequency based network protocol and/or variations thereof). Each of the wireless communication devices 502 may include a built-in radio and/or is coupled to a radio. Such wireless communication devices 502 and/or access points 506 may operate in accordance with the various aspects of the disclosure as presented herein to enhance performance, reduce costs and/or size, and/or enhance broadband applications. Each wireless communication devices 502 may have the capacity to function as a client node seeking access to resources (e.g., data, and connection to networked nodes such as servers) via one or more access points 506.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 5B:
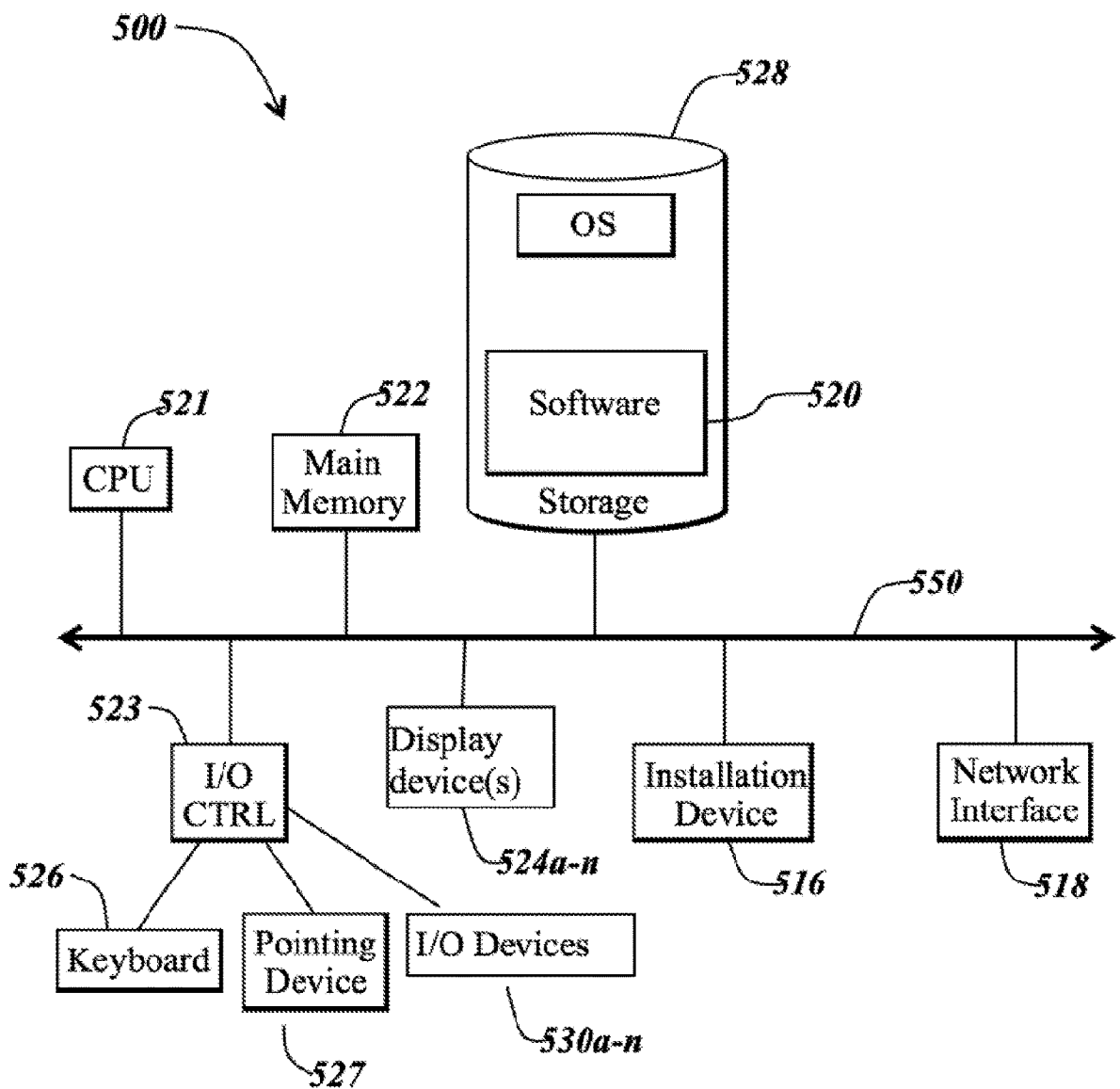
FIGS. 5B and 5C are block diagrams depicting embodiments of computing devices useful in connection with the methods and systems described herein.
Figure 5C:
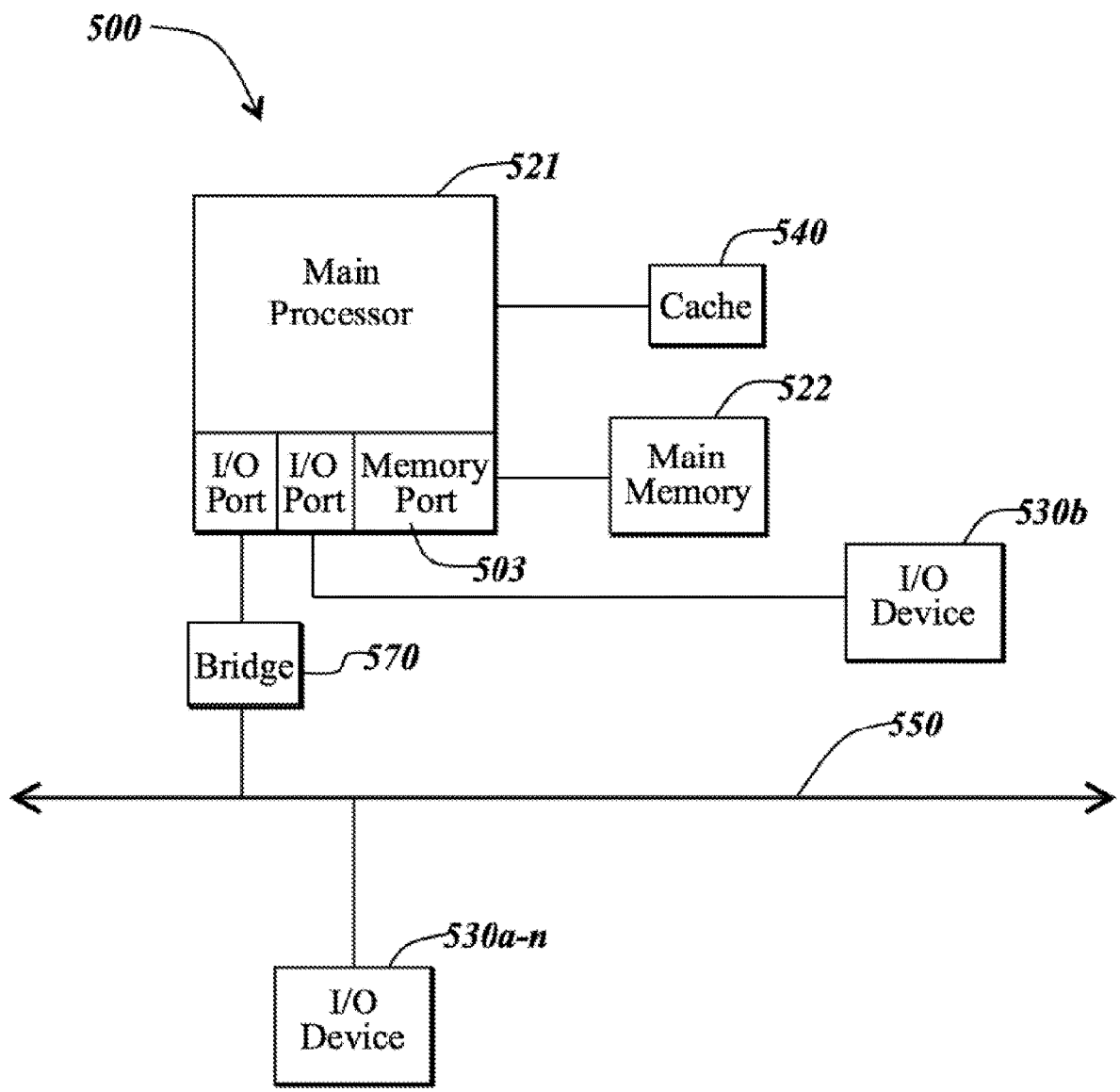

FIGS. 5B and 5C are block diagrams depicting embodiments of computing devices useful in connection with the methods and systems described herein. The communications device(s) 502 and access point(s) 506 may be deployed as and/or executed on any type and form of computing device, such as a computer, network device or appliance capable of communicating on any type and form of network and performing the operations described herein. FIGS. 5B and 5C depict block diagrams of a computing device 500 useful for practicing an embodiment of the wireless communication devices 502 or the access point 506. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5C, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5B, the processor 521 communicates with main memory 522 via a system bus 550 (described in more detail below). FIG. 5C depicts an embodiment of a computing device 500 in which the processor communicates directly with main memory 522 via a memory port 503. For example, in FIG. 5C the main memory 522 may be DRDRAM.

FIG. 5C depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5C, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computer 500 in which the main processor 521 may communicate directly with I/O device 530b, for example via HYPERTRANSPORT, RAPIDIO, or INFINIBAND communications technology. FIG. 5C also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5B. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, California.

Referring again to FIG. 5B, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some embodiments, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5B and 5C may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method of preventing data exfiltration from a secure network, comprising:
   receiving, at a device of a first network zone, a first internet protocol (IP) packet;
   determining, by a processor of the device, that a first protocol above a network layer and a first size of the first IP packet matches a predetermined policy of a plurality of predetermined policies;
   inspecting, by the processor, a first payload of the first IP packet based on the predetermined policy to identify a first format of the first IP packet;
   detecting, by the processor responsive to inspecting the first payload, that the first payload includes a first set of data that violates the first format;
   determining, by the processor responsive to detecting the first set of data, that the first IP packet improperly complies with the first format;
   responsive to determining that the first IP packet improperly complies with the first format, truncating, by the processor, the first payload of the first IP packet to a size determined based on the first format, wherein truncating the first payload of the first IP packet includes removing the first set of data from the first payload;
   receiving, at the device of the first network zone, a second IP packet;
   determining, by the processor, that a second protocol above the network layer and a second size of the second IP packet matches the predetermined policy;
   inspecting, by the processor, a second payload of the second IP packet based on the predetermined policy to identify a second source, a second destination, and a second format of the second IP packet;
   determining, by the processor, that each of the second source, the second destination, and the second format is proper based on the predetermined policy; and
   transmitting, by the processor, the second IP packet responsive to determining that the second format is proper.

2. The method of claim 1, wherein the first network zone is in a secure network and the device is an edge device of the secure network.

3. The method of claim 1, wherein the first IP packet is a Domain Name System (DNS) packet, and further comprising determining, by the processor, that the DNS packet is an unsolicited DNS response.

4. The method of claim 1, wherein the first IP packet is a Domain Name System (DNS) packet, and wherein determining that the first IP packet improperly complies with the first format comprises determining, by the processor, that the first payload includes a domain name longer than a predetermined name length threshold.

5. The method of claim 1, wherein the first IP packet is an Internet Control Message Protocol (ICMP) packet, and further comprising determining, by the processor, that the ICMP packet is an unsolicited ICMP response.

6. The method of claim 1, wherein the first IP packet is an Internet Control Message Protocol (ICMP) packet, and wherein determining that the first IP packet improperly complies with the first format comprises determining, by the processor, that the first payload includes a message longer than a predetermined message length.

7. The method of claim 1, wherein the first IP packet is one of a Network Time Protocol (NTP) or a Simple Network Time Protocol (SNTP) packet, the method further comprising inspecting a stratum value and a root delay value of the first IP packet.

8. The method of claim 1, wherein the first IP packet is one of a Network Time Protocol (NTP) or a Simple Network Time Protocol (SNTP) packet, and wherein determining that the first IP packet improperly complies with the first format comprises determining, by the processor, that the first IP packet does not conform to the NTP or SNTP protocol.

9. The method of claim 1, further comprising logging the first IP packet responsive to truncating the first IP packet.

10. The method of claim 1, wherein the first payload of the first IP packet is further truncated based on an expected payload size of the first format.

11. A system for preventing data exfiltration from a secure network, comprising:
a device associated with a first network zone comprising a processor and a network interface;
wherein the network interface is configured to receive a first internet protocol (IP) packet and receive a second IP packet;
wherein the processor is configured to:
determine that a first protocol above a network layer and a first size of the first IP packet matches a predetermined policy of a plurality of predetermined policies;
inspect a first payload of the first IP packet based on the predetermined policy to identify a first format of the first IP packet;
detect, responsive to inspecting the first payload, that the first payload includes a first set of data that violates the first format;
determine, responsive to detecting the first set of data, that the first IP packet improperly complies with the first format;
responsive to determining that the first IP packet improperly complies with the first format, truncate the first payload of the first IP packet to a size determined based on the first format, wherein truncate the first payload of the first IP packet includes removing the first set of data from the first payload;
determine that a second protocol above the network layer and a second size of the second IP packet matches the predetermined policy;
inspect a second payload of the second IP packet based on the predetermined policy to identify a second source, a second destination, and a second format of the second IP packet; and
determine that each of the second source, the second destination, and the second format is proper based on the predetermined policy; and
wherein the network interface is further configured to transmit the second IP packet responsive to the determination that the second format is proper.

12. The system of claim 11, wherein the first network zone is in a secure network and the device is an edge device of the secure network.

13. The system of claim 11, wherein the first IP packet is a Domain Name System (DNS) packet, and wherein the processor is further configured to determine that the DNS packet is an unsolicited DNS response.

14. The system of claim 11, wherein the first IP packet is a Domain Name System (DNS) packet, and wherein the processor is further configured to determine that the first payload includes a domain name longer than a predetermined name length threshold.

15. The system of claim 11, wherein the first IP packet is an Internet Control Message Protocol (ICMP) packet, and wherein the processor is further configured to determine that the ICMP packet is an unsolicited ICMP response.

16. The system of claim 11, wherein the first IP packet is an Internet Control Message Protocol (ICMP) packet, and wherein the processor is further configured to determine that the first payload includes a message longer than a predetermined message length.

17. The system of claim 11, wherein the first IP packet is one of a Network Time Protocol (NTP) or a Simple Network Time Protocol (SNTP) packet, wherein the processor is further configured to inspect a stratum value and a root delay value of the first IP packet.

18. The system of claim 11, wherein the first IP packet is one of a Network Time Protocol (NTP) or a Simple Network Time Protocol (SNTP) packet, and wherein the processor is further configured to determine that the first format does not conform to the NTP or SNTP protocol.

19. The system of claim 11, wherein the processor is further configured to log the first IP packet responsive to truncating the first IP packet.

20. The system of claim 11, wherein the first payload of the first IP packet is further truncated to an expected payload size of the first format.

* * * * *